United States Patent
Ahn et al.

(10) Patent No.: US 8,582,523 B2
(45) Date of Patent: Nov. 12, 2013

(54) METHOD FOR TRANSMITTING A DOWNLINK SIGNAL IN A WIRELESS COMMUNICATION SYSTEM AND APPARATUS FOR SAME

(75) Inventors: Joon Kui Ahn, Anyang-si (KR); Min Gyu Kim, Anyang-si (KR); Suck Chel Yang, Anyang-si (KR); Dong Youn Seo, Anyang-si (KR); Byoung Hoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 71 days.

(21) Appl. No.: 13/319,664

(22) PCT Filed: Dec. 10, 2010

(86) PCT No.: PCT/KR2010/008845
§ 371 (c)(1),
(2), (4) Date: Nov. 9, 2011

(87) PCT Pub. No.: WO2011/074836
PCT Pub. Date: Jun. 23, 2011

(65) Prior Publication Data
US 2012/0057559 A1    Mar. 8, 2012

Related U.S. Application Data

(66) Substitute for application No. 13/319,664, filed on Nov. 9, 2011, now Pat. No. Plant.

(51) Int. Cl.
*H04W 4/00* (2009.01)
*H04J 1/00* (2006.01)

(52) U.S. Cl.
USPC .......................... 370/329; 370/343; 370/480

(58) Field of Classification Search
USPC ......... 370/328–330, 340, 341, 343, 344, 431, 370/436, 438, 439, 480, 482
See application file for complete search history.

(56) References Cited

U.S. PATENT DOCUMENTS

| 8,254,245 | B2 * | 8/2012 | Kim et al. ..................... 370/207 |
| 2009/0097423 | A1 | 4/2009 | Choi et al. |
| 2010/0118800 | A1 | 5/2010 | Kim et al. |
| 2011/0026419 | A1 * | 2/2011 | Kim et al. ..................... 370/252 |
| 2013/0028238 | A1 * | 1/2013 | Kim et al. ..................... 370/336 |

FOREIGN PATENT DOCUMENTS

| KR | 10-2007-0107614 A | 11/2007 |
| KR | 10-2008-0096358 A | 10/2008 |
| KR | 10-2009-0037745 A | 4/2009 |
| KR | 10-2009-0101406 A | 9/2009 |

* cited by examiner

*Primary Examiner* — Kerri Rose
(74) *Attorney, Agent, or Firm* — Birch, Stewart, Kolasch & Birch, LLP

(57) ABSTRACT

The present invention discloses a method in which a base station transmits a downlink signal in a wireless communication system. In detail, the method comprises the following steps: allocating a transmitting resource to data symbols for transmitting downlink signals, in the direction of increasing a frequency index; and transmitting the downlink signal to a terminal, using the allocated resource. The frequency band of preset orthogonal frequency division multiplexing (OFDM) symbols, from among the transmitting resource, contains a control domain and a segment band. The step of allocating the transmitting resource comprises the step of puncturing the data symbol using a control channel, to which the control domain contained in the preset OFDM symbols is allocated.

10 Claims, 19 Drawing Sheets

FIG. 2
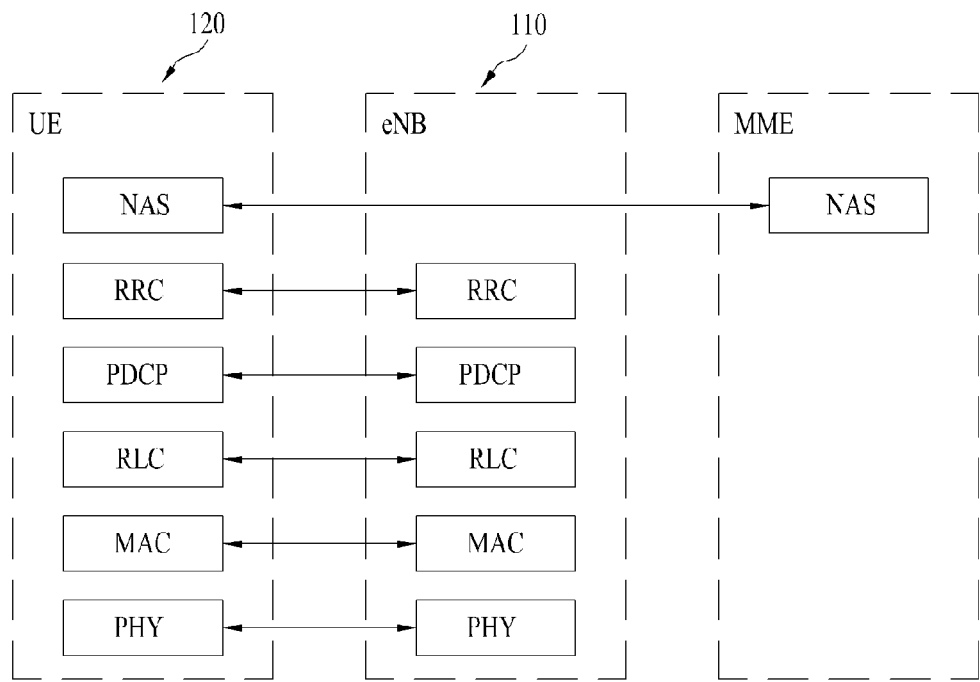
(a) CONTROL-PLANE PROTOCOL STACK
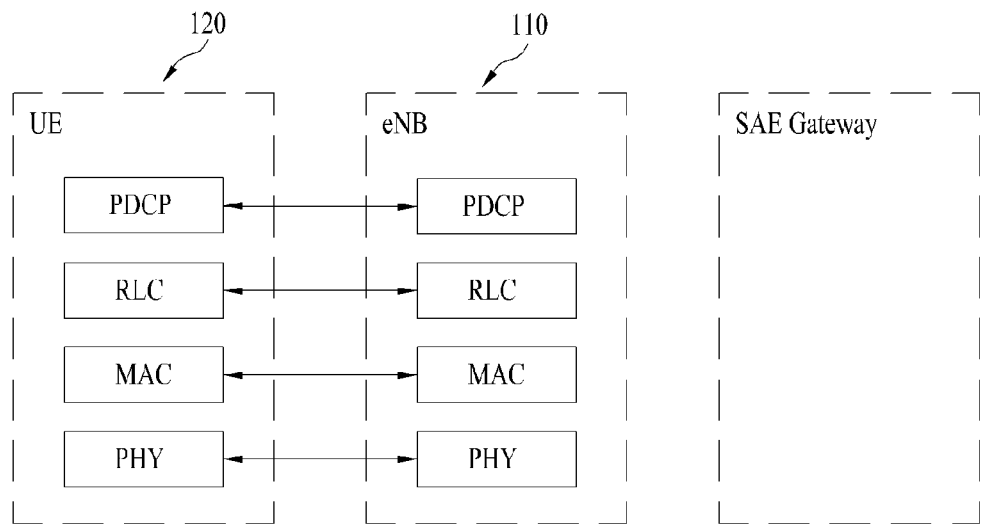
(b) USER-PLANE PROTOCOL STACK FIG. 14
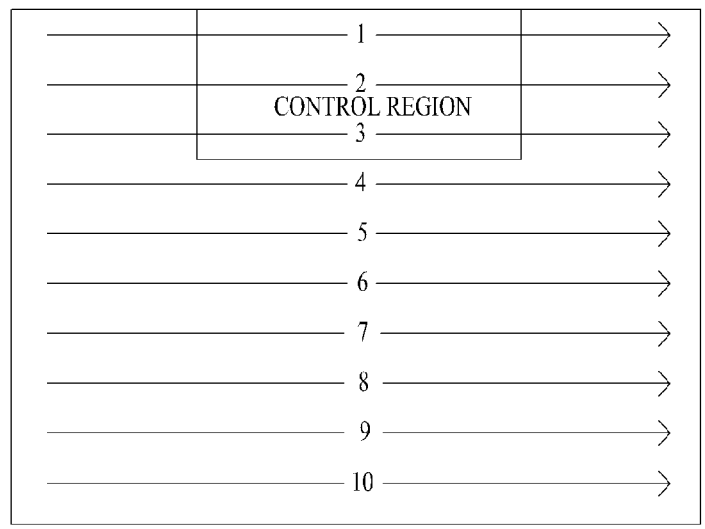
(a)
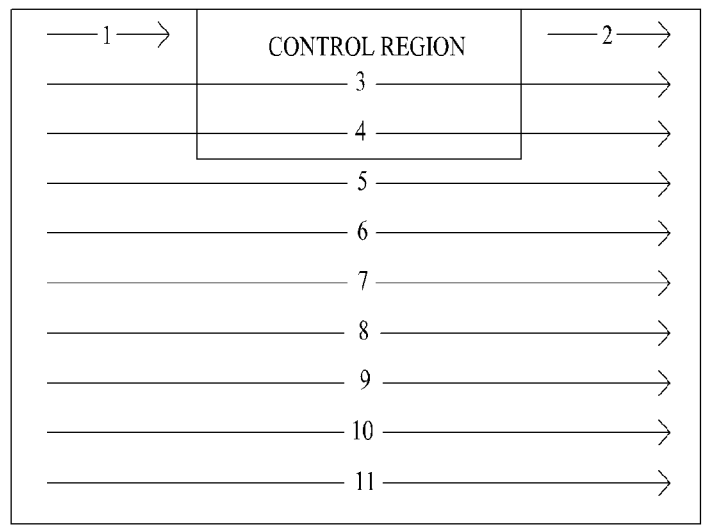
(b)

FIG. 15
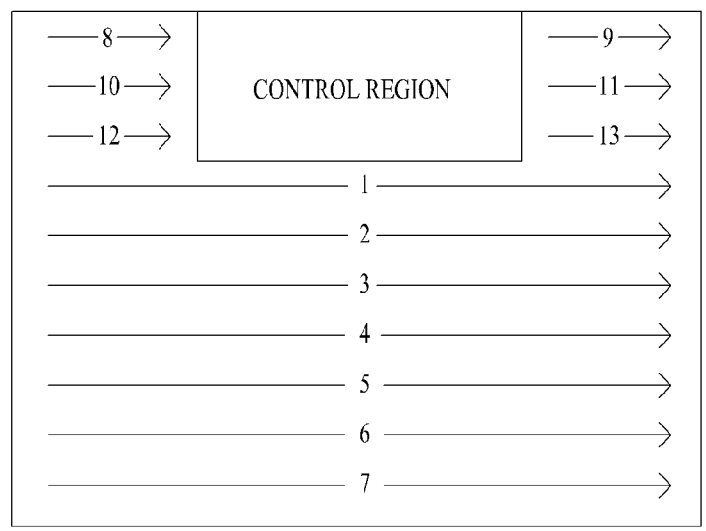
(a)
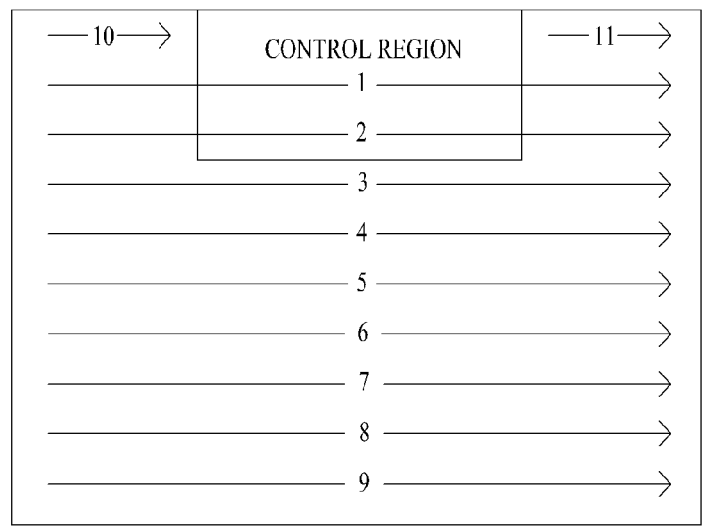
(b)

FIG. 16
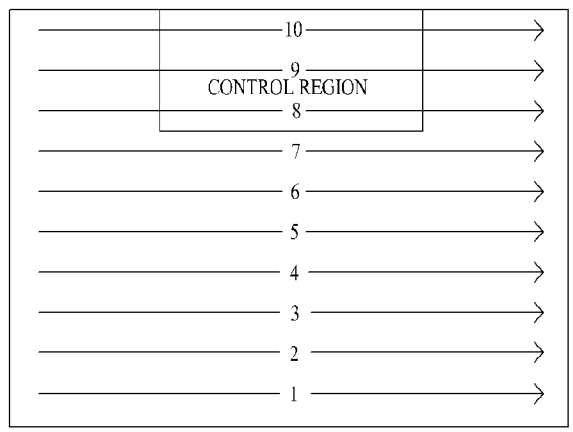
(a)
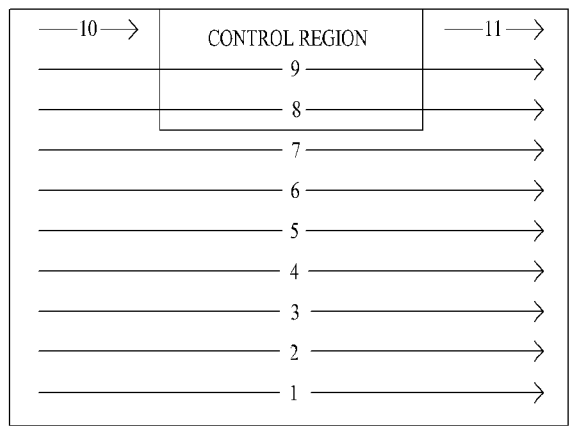
(b)
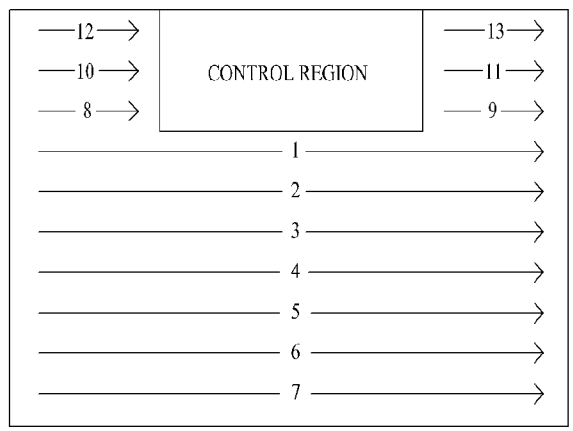
(c)

METHOD FOR TRANSMITTING A DOWNLINK SIGNAL IN A WIRELESS COMMUNICATION SYSTEM AND APPARATUS FOR SAME

CROSS REFERENCE TO RELATED APPLICATIONS

This application is a National Phase application of PCT/KR2010/008845 filed on Dec. 10, 2010, which claims the benefit under 35 U.S.C. §119(e) of U.S. Provisional Application No. 61/286,351 filed on Dec. 14, 2009. The entire contents of the above applications are hereby incorporated by reference.

TECHNICAL FIELD

The present invention relates to a radio communication system, and more particularly, to a method for transmitting a downlink signal in a radio communication system and an apparatus therefor.

BACKGROUND ART

As an example of a radio communication system to which the present invention is applicable, a $3^{rd}$ Generation Partnership Project (3GPP) Long Term Evolution (LTE) communication system will be schematically described.

FIG. 1 is a diagram showing a network structure of an Evolved Universal Mobile Telecommunications System (E-UMTS) as a radio communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE) 120, base stations (or eNBs or eNode Bs) 110a and 110b, and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although radio communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

The standardization of the subsequent technology of the LTE is ongoing in the 3GPP. In the present specification, the above-described technology is called "LTE-Advanced" or "LTE-A". The LTE system and the LTE-A system are different from each other in terms of system bandwidth. The LTE-A system aims to support a wideband of a maximum of 100 MHz. The LTE-A system uses carrier aggregation or bandwidth aggregation technology which achieves the wideband using a plurality of frequency blocks. The carrier aggregation enables the plurality of frequency blocks to be used as one large logical frequency band in order to use a wider frequency band. The bandwidth of each of the frequency blocks may be defined based on the bandwidth of a system block used in the LTE system. Each frequency block is transmitted using a component carrier.

DISCLOSURE

Technical Problem

An object of the present invention is to provide a method for transmitting a downlink signal in a radio communication system and an apparatus therefor.

The technical problems solved by the present invention are not limited to the above technical problems and those skilled in the art may understand other technical problems from the following description.

Technical Solution

The object of the present invention can be achieved by providing a method for transmitting a downlink signal by a base station in a radio communication system, including allocating transmission resources to data symbols for transmitting the downlink signal in a direction in which a frequency index is increased, and transmitting the downlink signal to a user equipment using the allocated resources, wherein a frequency band of preset orthogonal frequency division multiplexing symbols of the transmission resources includes a control region and a segment band, and wherein the allocating the transmission resources includes puncturing the data symbols, to which the control region included in the preset OFDM symbols is allocated, using a control channel. The allocating the transmission resources may include allocating time resources to the data symbols in a direction in which an OFDM symbol index is increased.

In another aspect of the present invention, there is provided a base station apparatus of a radio communication system, including a processor configured to allocate transmission resources to data symbols for transmitting a downlink signal in a direction in which a frequency index is increased, and a transmission module configured to transmit the downlink signal to a user equipment using the allocated resources, wherein a frequency band of preset orthogonal frequency division multiplexing (OFDM) symbols of the transmission resources includes a control region and a segment band, and wherein the data symbols, to which the control region included in the preset OFDM symbols is allocated, are punctured using a control channel. The processor may allocate time resources to the data symbols in a direction in which an OFDM symbol index is increased.

The control region included in a first OFDM symbol of the preset OFDM symbols may not be allocated to the data symbols or the control region included in the preset OFDM symbols may not be allocated to the data symbols.

Component carriers over which the segment band is transmitted may be different from component carriers over which a legacy band corresponding to the control region is transmitted.

Advantageous Effects

According to the embodiments of the present invention, it is possible to efficiently transmit a downlink signal in a radio communication system.

The effects of the present invention are not limited to the above-described effects and other effects which are not described herein will become apparent to those skilled in the art from the following description.

DESCRIPTION OF DRAWINGS

FIG. 2 is a diagram showing a radio interface protocol architecture between a User Equipment (UE) and an Evolved Universal Terrestrial Radio Access Network (E-UTRAN) based on a $3^{rd}$ Generation Partnership Project (3GPP) radio access network standard.

FIG. 14 is a diagram illustrating a method of mapping data symbols for transmitting a downlink signal according to the second embodiment of the present invention.

FIG. 15 is a diagram illustrating a method of mapping data symbols for transmitting a downlink signal according to a third embodiment of the present invention.

FIG. 16 is a diagram illustrating a method of mapping data symbols for transmitting a downlink signal according to a fourth embodiment of the present invention.

BEST MODE

Figure 1:
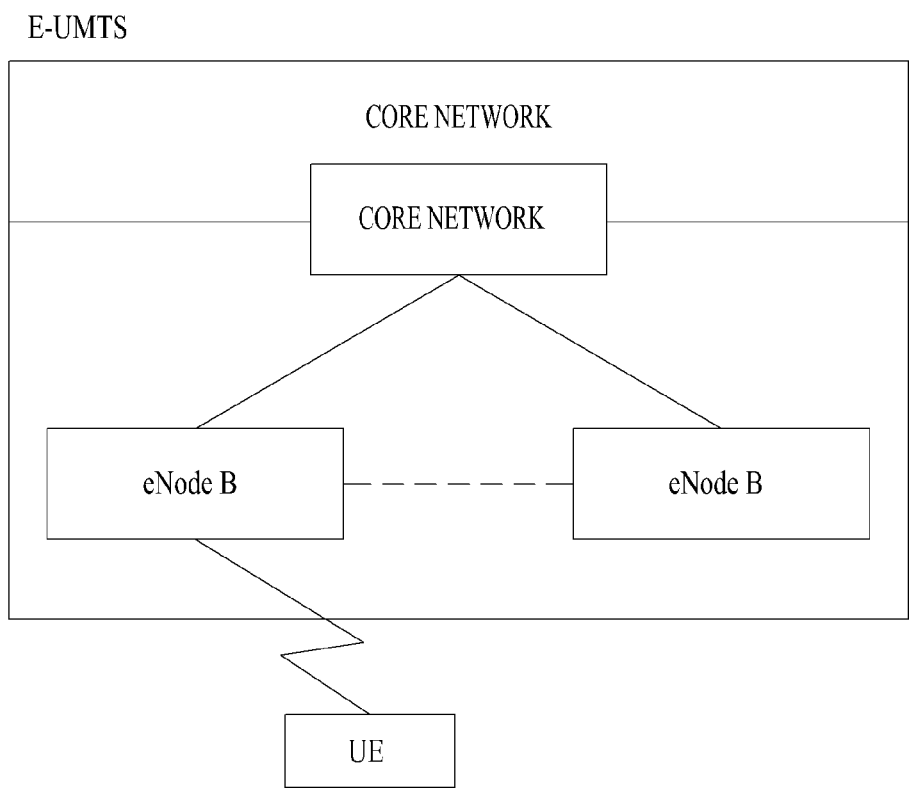
FIG. 1 is a diagram showing a network structure of an Evolved Universal Mobile Telecommunications System (E-UMTS) as an example of a wireless communication system.

The configuration, operation and other features of the present invention will be understood by the embodiments of the present invention described with reference to the accompanying drawings. The following embodiments are examples of applying the technical features of the present invention to a $3^{rd}$ Generation Partnership Project (3GPP) system.

In the present specification, a 3GPP LTE (Release-8) system is called an LTE system or a legacy system. A user equipment (UE) which supports an LTE system is called an LTE UE or a legacy UE. A 3GPP LTE-A (Release-9) system is called an LTE-A system or an evolved system. A UE which supports an LTE-A system is called an LTE-A UE or an evolved UE.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
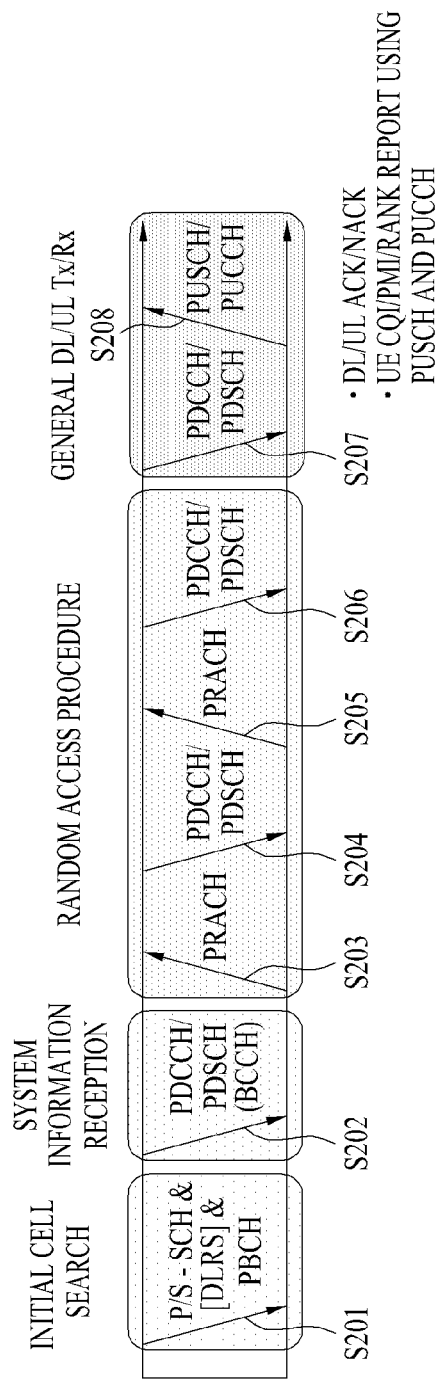
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and Physical Uplink Shared Channel PUSCH)/Physical Uplink Control Channel (PUCCH) transmission (S308) as a general uplink/downlink signal transmission procedure. The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
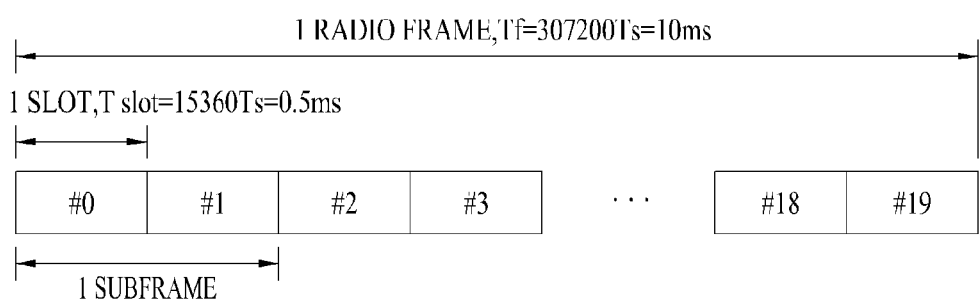
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \cdot T_s$) and includes 10 subframes with the same size. Each of the subframes has a length of 1 ms and includes two slots. Each of the slots has a length of 0.5 ms ($15360 \cdot T_s$). $T_s$ denotes a sampling time, and is represented by $T_s=1/(15 \text{ kHz} \times 2048)=3.2552 \times 10^{-8}$ (about 33 ns). Each slot includes a plurality of OFDM or SC-FDMA symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Figure 5:
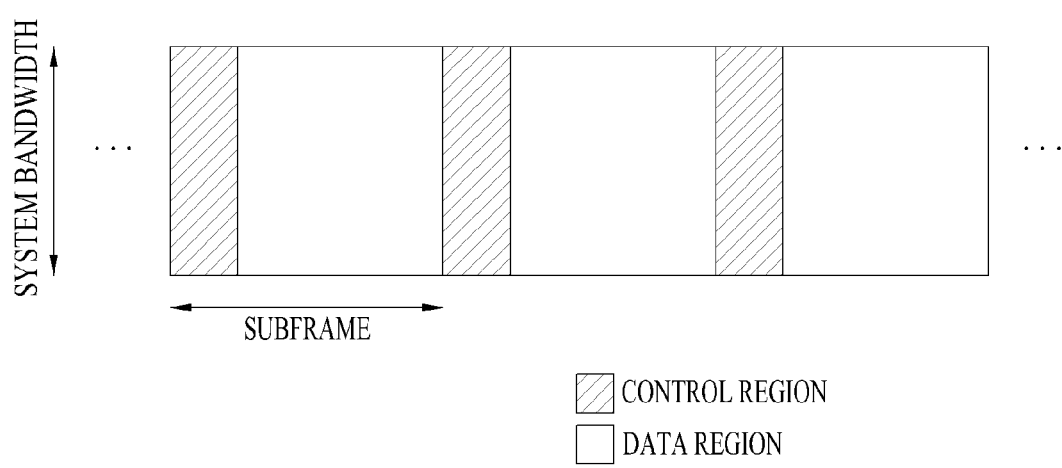
FIG. 5 is a diagram showing the functional structure of a downlink radio frame in an LTE system.

FIG. 5 is a diagram showing the structure of a downlink radio frame in an LTE system.

Referring to FIG. 5, the downlink radio frame includes 10 subframes with the same length. In the 3GPP LTE system, the subframe is defined as the basic time unit of packet scheduling with respect to an overall downlink frequency. Each subframe is divided into a control region for transmission of scheduling information and other control channels and a data region for transmission of downlink data. The control region starts from a first OFDM symbol of a subframe and includes one or more OFDM symbols. The size of the control region may be independently set for each subframe. The control region is used to transmit an L1/L2 (layer 1/layer 2) control signal. The data region is used to transmit downlink traffic.

Figure 6:
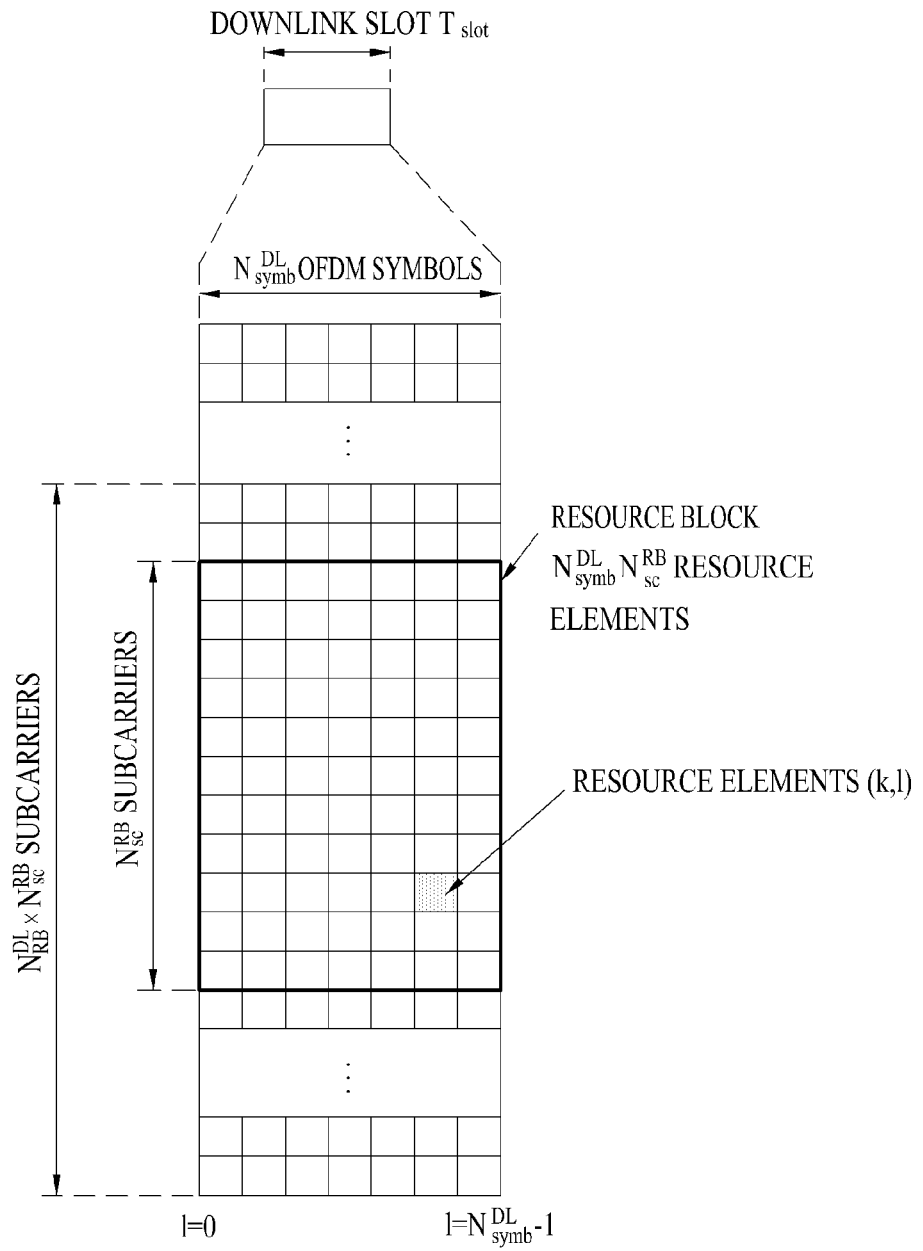
FIG. 6 is a diagram showing a resource grid for a downlink slot in an LTE system.

FIG. 6 is a diagram showing a resource grid for a downlink slot in an LTE system.

Referring to FIG. 6, the downlink slot includes $N_{symb}^{DL}$ OFDM symbols in a time domain and $N_{RB}^{DL}$ RBs in a frequency domain. Since each RB includes $N_{sc}^{RB}$ subcarriers, the downlink slot includes $N_{RB}^{DL} \times N_{sc}^{RB}$ subcarriers in the frequency domain. Although the downlink slot includes 7 OFDM symbols and the RB includes 12 subcarriers in FIG. 6 [도 3으로 되어 있음], the present invention is not limited thereto. For example, the number of OFDM symbols included in the downlink slot may be changed according to the length of cyclic prefix (CP).

Each element on the resource grid is referred to as a resource element (RE) and one RE is indicated by one OFDM symbol index and one subcarrier index. One RB includes $N_{symb}^{DL} \times N_{sc}^{RB}$ REs. The number $N_{RB}^{DL}$ of RBs included in the downlink slot depends on a downlink transmission bandwidth set in the cell.

Figure 7:
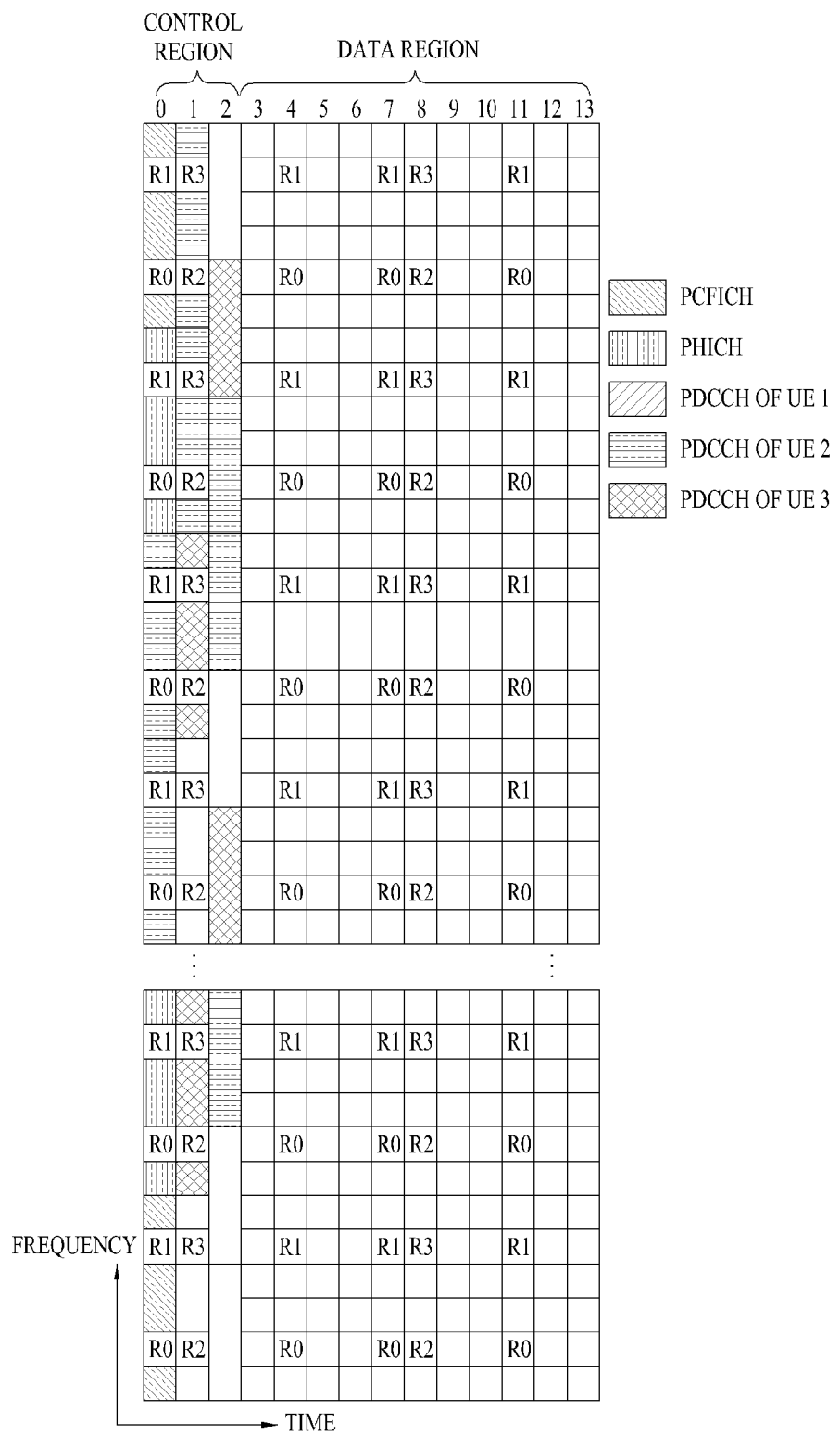
FIG. 7 is a diagram showing a control channel included in a control region of a subframe in an LTE system.

FIG. 7 is a diagram showing a control channel included in a control region of a subframe in an LTE system.

Referring to FIG. 7, the subframe is composed of 14 OFDM symbols. According to the configuration of the subframe, the first one to three OFDM symbols are used as the control region and the remaining 13 to 11 OFDM symbols are used as the data region.

In FIG. 7, R1 to R4 denote Reference Signals (RS) of antennas 0 to 3. The RS is fixed within the subframe with a constant pattern regardless of the control region and the data region. Control channels are resources, to which the RSs are not allocated, in the control region, and traffic channels are allocated to resources, to which the RSs are not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), and the like.

The PCFICH informs the UE of the number of OFDM symbols used in the PDCCH for each subframe. The PCFICH is located at a first OFDM symbol and is set prior to the PHICH and the PDCCH. The PCFICH is composed of four Resource Element Groups (REGs), and the REGs are distributed within the control region based on a cell Identity (ID). One REG is composed of four Resource Elements (REs). The structure of the REG will be described in detail with reference to FIG. 8. The PCFICH value indicates values of 1 to 3 and is modulated using a Quadrature Phase Shift Keying (QPSK) scheme.

The PHICH is used to transfer HARQ ACK/NACK in uplink transmission. The PHICH is composed of three REGs and is scrambled on cell-specific basis. The ACK/NACK signal is indicated by 1 bit, is spread using a Spreading Factor (SF) of 2 or 4, and is repeated three times. A plurality of PHICHs may be mapped to the same resources. The PHICH is modulated using a binary phase shift keying (BPSK) scheme.

The PDCCH is allocated to first n OFDM symbols of the subframe. Here, n is an integer of 1 or more and is indicated by the PCFICH. The PDCCH is composed of one or more Control Channel Elements (CCEs), which will be described in detail below. The PDCCH informs UEs or a UE group of information associated with resource allocation of a Paging Channel (PCH) and a Downlink-Shared Channel (DL-SCH) of a transport channel, Uplink scheduling Grant, HARQ information or the like.

The PCH and the DL-SCH are transmitted through the PDSCH. Accordingly, the eNB and the UE generally transmit and receive data through the PDSCH except for specific control information or specific service data.

Information indicating to which UE (one or a plurality of UEs) the data of the PDSCH is transmitted and how UEs receive and decode the data of the PDSCH is transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor the PDCCH using RNTI information thereof, and if one or more UEs having "A" RNTI are present, the UEs receive the PDSCH indicated by "B" and "C" through the information about the received PDCCH.

Meanwhile, in a mobile communication system, for reliable transmission, a transmitter performs channel coding. In this case, a receiver performs coding with respect to information transmitted from the transmitter using a forward error correction code and transmits the coded information, in order to correct a signal error which occurs in a channel. The receiver demodulates the received signal and performs a decoding process on the forward error correction code so as to restore the transmitted information. The receiver corrects the error of the received signal, which occurs in the channel, in the decoding process.

Various types of forward error correction codes may be used, but, in the present invention, for example, a turbo code will be described. The turbo encoder includes a Recursive Systematic Convolution (RSC) encoder and an interleaver. It is known that, as the size of an input data block is increased, the performance of the turbo encoder is improved. In an actual radio communication system, for convenience of implementation, a data block having a predetermined size or more is segmented into several small data blocks and coding is performed. The segmented small data block is called a code block. Code blocks generally have the same size, but one code block may have a size different from that of the other code blocks due to a limit in size of the interleaver. When one data block is segmented into two or more code blocks, a CRC may be added to each of the code blocks for error detection.

The RSC encoder performs a forward error correction coding process according to the predetermined size of the interleaver, that is, in the code block units. Then, the interleaver performs interleaving in order to reduce influence of a burst error occurring upon transmission of the signal through a radio channel. Then, the signal is transmitted in a state of being mapped to the radio resources.

Figure 8:
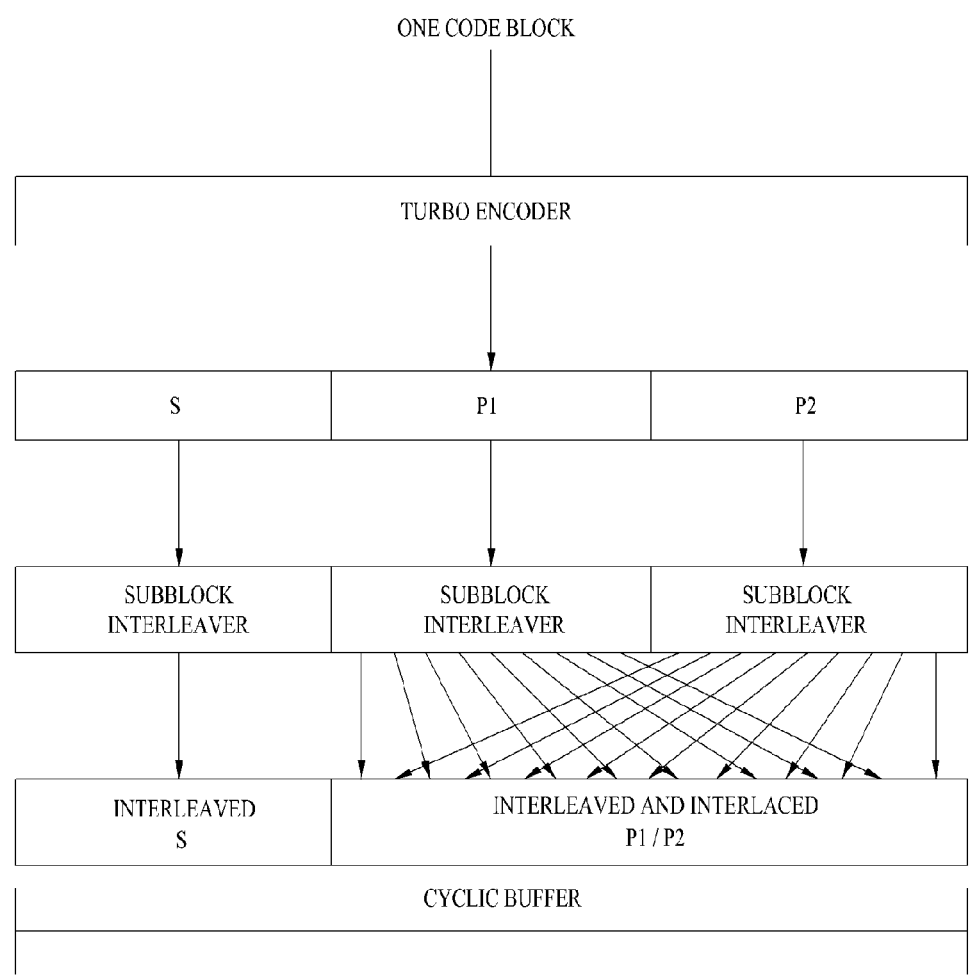
FIG. 8 is a flowchart illustrating a method of separating an information part and a parity part of a coded code block and performing rate matching.

Since the amount of radio resources used for actual transmission is constant, the encoded code block should be subjected to rate matching. In general, rate matching includes puncturing or repetition. Rate matching may be performed in the encoded code block units. As another method, the encoded code block may be segmented into an information (systematic data) part and a parity bit part and the segmented parts may be separately subjected to rate matching. FIG. 8 is a flowchart illustrating a method of segmenting an information part and a parity part of an encoded code block so as to perform rate matching. In FIG. 8, it is assumed that a code rate is ⅓.

Figure 9:
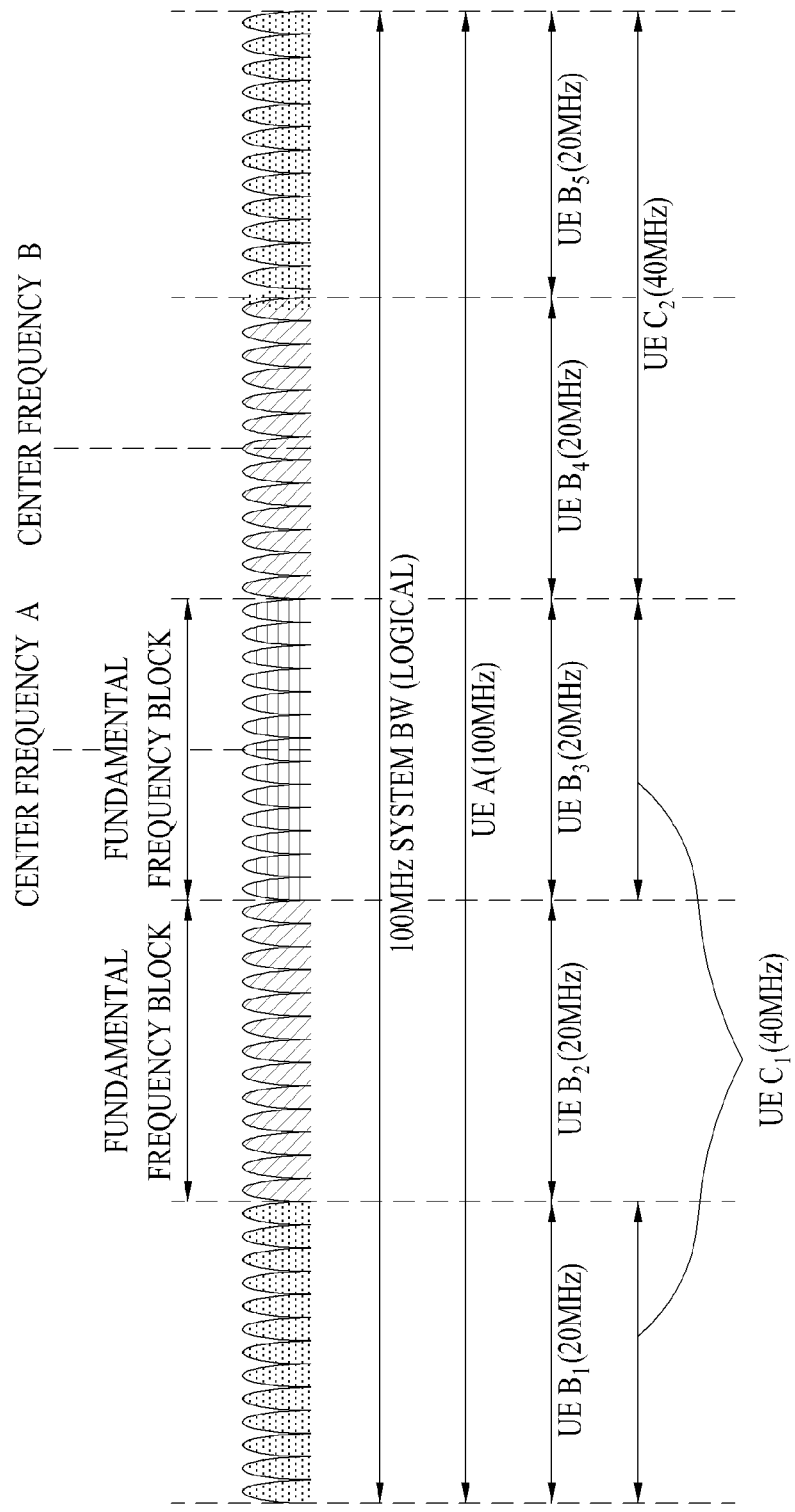
FIG. 9 is a conceptual diagram illustrating carrier aggregation.

FIG. 9 is a conceptual diagram illustrating carrier aggregation. Carrier aggregation refers to a method of using a plurality of component carriers as a large logical frequency band in order to use a wider frequency band in a radio communication system.

Referring to FIG. 9, an entire system band has a maximum bandwidth of 100 MHz. The entire system band includes five component carriers (CCs) and each CC has a maximum bandwidth of 20 MHz. The CC includes one or more physically contiguous subcarriers. Although all CCs have the same bandwidth in FIG. 9, this is only exemplary and the CCs may have different bandwidths. Although the CCs are shown as being contiguous in the frequency domain, the CCs may be physically contiguous or separated.

Different center frequencies may be used for the CCs or one common center frequency may be used for physically contiguous CCs. For example, in FIG. 9, if it is assumed that all CCs are physically contiguous, a center frequency A may be used. If it is assumed that CCs are not physically contiguous, a center frequency A, a center frequency B and the like may be used for the respective CCs.

In the present specification, the CC may correspond to a system band of a legacy system. By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system band of the LTE system. In this case, the CC may have any one bandwidth such as 1.25, 2.5, 5, 10 or 20 MHz.

In the case in which the entire system band is extended by carrier aggregation, a frequency band used for communication with each UE is defined in CC units. A UE A may use 100 MHz which is the bandwidth of the entire system band and perform communication using all five component carriers. Each of UEs $B_1$ to $B_5$ may only use a bandwidth of 20 MHz and perform communication using one CC. Each of UEs $C_1$ and $C_2$ may use a bandwidth of 40 MHz and perform communication using two CCs. The two CCs may be contiguous or discontiguous. The UE $C_1$ uses two discontiguous CCs and the UE $C_2$ uses two contiguous CCs.

Figure 10:
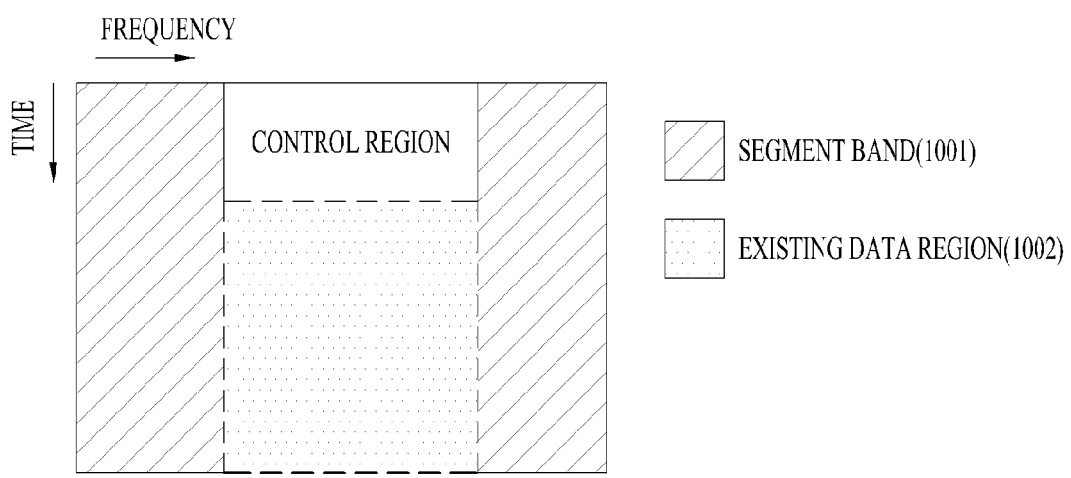
FIG. 10 is a diagram showing a segment band defined in an LTE-A system.

FIG. 10 is a diagram illustrating a scheduling method in an LTE-A system.

One downlink CC and one uplink CC may be used in the LTE system and several CCs may be used in the LTE-A system as shown in FIG. 10. At this time, a method of scheduling a data channel by a control channel may be divided into a linked carrier scheduling method and a cross carrier scheduling method.

More specifically, in the linked carrier scheduling method, similarly to the LTE system using a single CC, a control channel transmitted via a specific CC schedules only a data channel via the specific CC.

In contrast, in the cross carrier scheduling method, a control channel transmitted via a primary CC using a carrier indicator (CI) schedules a data channel transmitted via the primary CC or another CC.

The cross carrier scheduling method causes serious errors as compared to the linked carrier scheduling method when errors occur in the CI. For example, if errors occur in the CI transmitted via the primary CC, the location of an OFDM symbol in which a data region is started is changed in different CCs. Thus, in a receiver, code bits located at different locations may be combined in a HARQ buffer combining process.

FIG. 10 is a diagram illustrating a segment band defined in an LTE-A system.

Referring to FIG. 10, the segment band is a region added to a downlink subframe of the existing LTE system and refers to a frequency band in which a control region for transmitting physical control channels such as a PDSCH, a PHICH and a PFFICH is not included.

For example, if three downlink CCs are aggregated and the cross scheduling method is applied, the region excluding the existing LTE subframe may be defined as the segment band. If the frequency band of one downlink CC has an unnormalized bandwidth of 14 MHz, 10 MHz of a downlink frequency band of the existing LTE system is located in the middle of the frequency band and the remaining frequency band of 4 MHz is located at both sides of the downlink subframe of the LTE system by 2 MHz as the segment bands.

If a segment band is present even in OFDM symbols which included only a control region, a PDSCH which is a data channel may be mapped. The present invention proposes a method of mapping a PDSCH in a downlink CC including a segment band.

First, OFDM symbols included in one subframe are divided into symbols which transmit a control signal and symbols which do not transmit a control signal, which will be described in detail with reference to the drawings.

Figure 11:
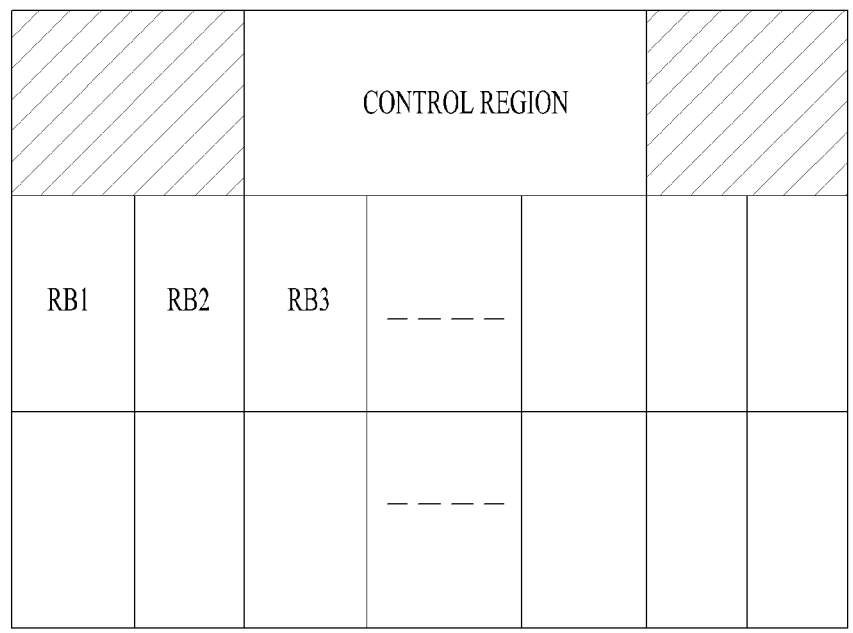
FIG. 11 is a diagram illustrating a method of allocating resources for transmitting a downlink signal according to a first embodiment of the present invention.

FIG. 11 is a diagram illustrating a method of mapping data symbols for transmitting a downlink signal according to a first embodiment of the present invention.

In symbols which do not transmit a control signal, as shown in FIG. 11, the same resource block (RB) as the conventional RB is defined. Next, in symbols which transmit a control signal, an independent RB different from the conventional RB is defined.

Since the newly defined RB is defined independent of the existing RB, data channel mapping in the newly defined RB may also be independently defined. That is, the newly defined RB is subdivided into a plurality of RBs or one RB may be configured.

Hereinafter, a method of allocating a data channel using a conventional data channel mapping method without defining the RB of the segment band independent of the conventional RB will be described. Although only a method of mapping data symbols in a direction in which a frequency index is increased is shown in the following embodiment, a method of allocating data symbols in a direction in which a frequency index is decreased may be used. Hereinafter, for convenience of description, the entire frequency band is divided into a segment band and a legacy band.

Although a data symbol mapping method based on all frequency resources and time resources included in one subframe is described in the following embodiments, from the viewpoint of a specific UE, a data symbol mapping method according to each embodiment is applied within RBs allocated to the UE.

Figure 12:
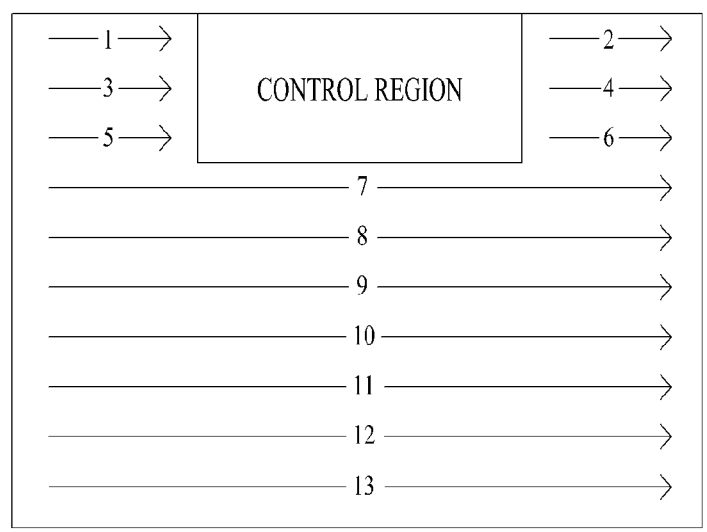
FIG. 12 is a diagram illustrating a method of mapping data symbols for transmitting a downlink signal according to a second embodiment of the present invention.

FIG. 12 is a diagram illustrating a method of mapping data symbols for transmitting a downlink signal according to a second embodiment of the present invention.

In particular, in FIG. 12, data symbols are mapped starting from a start OFDM symbol in the direction in which an OFDM symbol index is increased. Data symbols are mapped only to segment band excluding the control region in the OFDM symbols including the control region and data symbols are mapped to the segment band and the legacy band in the direction in which the frequency resource index is increased in the OFDM symbols including only the data region.

Figure 13:
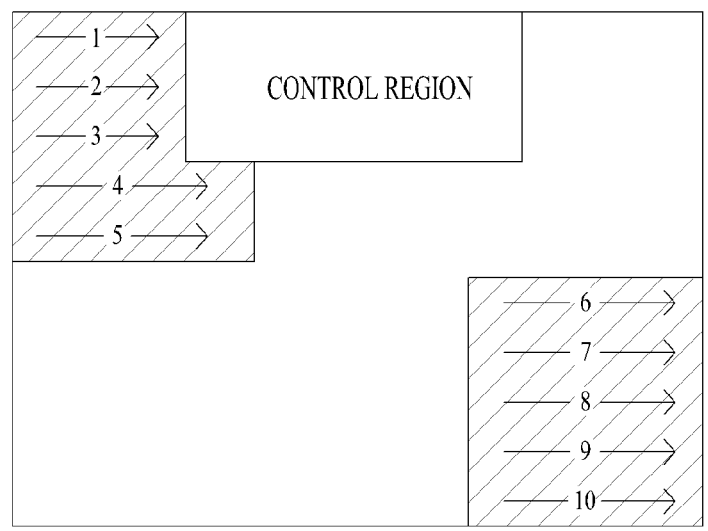
FIG. 13 is a diagram showing an example of mapping data symbols of a downlink signal transmitted to a specific UE according to the second embodiment of the present invention.

FIG. 13 is a diagram showing an example of mapping data symbols of a downlink signal transmitted to a specific UE according to the second embodiment of the present invention. In FIG. 13, shadow regions denote RBs allocated to the specific UE and the data symbols are mapped in the direction in which the frequency index is increased. That is, from the viewpoint of the specific UE, as shown in FIG. 13, the data symbol mapping method for transmitting the downlink signal, which is proposed by the present invention, is applicable within the RBs allocated to the UE.

FIG. 14 is a diagram illustrating a method of mapping data symbols for transmitting a downlink signal according to the second embodiment of the present invention.

While the data symbols are not mapped to the control region in the OFDM symbols including the control region in FIG. 13, the data symbols are also mapped to the control region in FIG. 14(a). However, the data symbols mapped to the control region are not actually transmitted and are punctured by the control channel. That is, while the eNB maps the control channel to the control region and transmits the control channel, the UE sequentially reads data on the assumption that the data symbols are mapped to the control region. By such method, even when the UE does not recognize the actual size of the control region, since the data symbols mapped to the control region are punctured by the control channel, the signal transmitted via the control region may be recognized as noise upon data decoding. Accordingly, in a data decoding buffer of the UE, errors do not occur due to the signal transmitted via the control region.

In FIG. 14(b), data symbols are mapped to all OFDM symbols excluding a minimum control region for preventing PCFICH errors, for example, a control region of a first OFDM symbol. The data symbols mapped to the OFDM symbols including the control region excluding the first OFDM symbol are punctured by the control channel. Since the minimum control region is always occupied by the control channel, the method shown in FIG. 14(b) is more efficient than the method shown in FIG. 14(a) in that the amount of data symbols punctured by the control channel is reduced.

FIG. 15 is a diagram illustrating a method of mapping data symbols for transmitting a downlink signal according to a third embodiment of the present invention.

Referring to FIG. 15(a), the data symbols are preferentially mapped starting from an OFDM symbol which does not include the control region in the direction in which the symbol index is increased. Thereafter, the data symbols are mapped to the segment band of the remaining OFDM symbols. In FIG. 15(a), a conventional data reading method of a UE may be applied to the OFDM symbols which do not include at least the segment band.

Referring to FIG. 15(b), the data symbols are preferentially mapped to the frequency band of the OFDM symbol next to the OFDM symbol including a minimum control region for preventing PCFICH errors, for example, the first OFDM symbol. Then, the data symbols are mapped to the remaining OFDM symbol, that is, the first OFDM symbol, excluding the minimum control region. Finally, the data symbols mapped to the actual control region are punctured by the control channel and are not transmitted.

FIG. 16 is a diagram illustrating a method of mapping data symbols for transmitting a downlink signal according to a fourth embodiment of the present invention. In particular, in the fourth embodiment, the data symbols are preferentially mapped to the frequency band of the last OFDM symbol of one subframe, unlike the above-described embodiments. In the fourth embodiment, since the UE performs reading from the data region, not from the control region, even when errors occur when the UE recognizes the actual control region, it is possible guarantee data reception robustness.

Referring to FIG. 16(a), the data symbols are preferentially mapped to the frequency band of the last OFDM symbol and are then mapped to the OFDM symbol including the control region. Similarly, the data symbols mapped to the control region are punctured by the control channel and are not transmitted.

In FIG. 16(b), the data symbols are preferentially mapped to the frequency band of the last OFDM symbol and are then mapped to the OFDM symbol including the control region. However, in the OFDM symbol including a minimum control region for preventing PCFICH errors, that is, the first OFDM symbol, the data symbols are not mapped to the minimum control region. Finally, the data maps mapped to the actual control region are punctured by the control channel and are not transmitted.

In FIG. 16(c), the data symbols are preferentially mapped to the frequency band of the last OFDM symbol. However, in the OFDM symbols including the control region, the data symbols are not mapped to the control region of the OFDM symbols.

The segment band and the existing frequency band, that is, the legacy band, experience different radio environments in terms of interference influence. If the segment band experiences a superior radio environment as compared to the legacy band, the data symbols are preferably preferentially mapped to the segment band in order to map systematic bits of the coded code block to the segment band. In a fifth embodiment, a method of preferentially mapping the data symbols to the segment band and then mapping the data symbols to the legacy band will be described.

Figure 17:
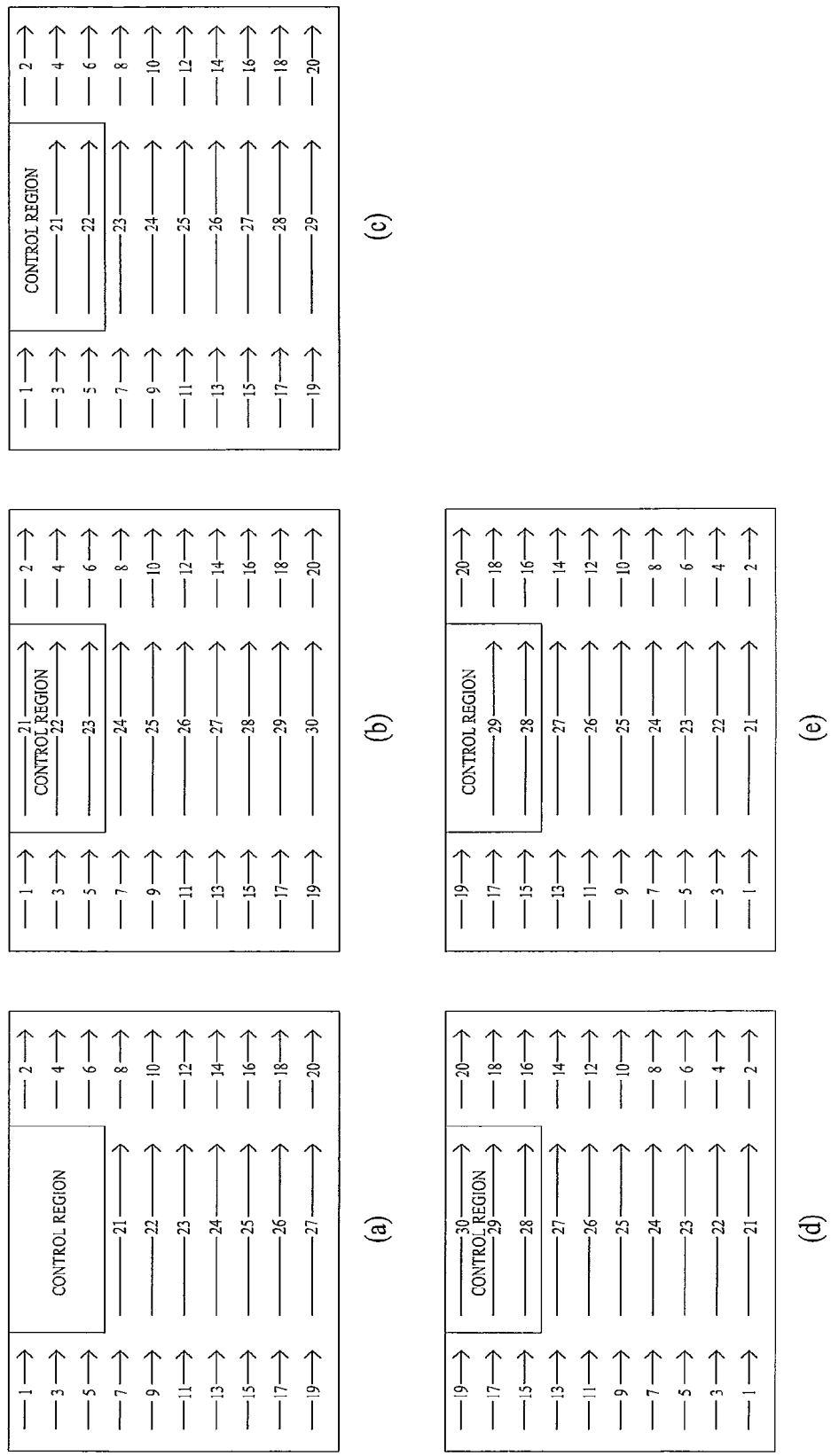
FIG. 17 is a diagram illustrating a method of mapping data symbols for transmitting a downlink signal according to a fifth embodiment of the present invention.

FIG. 17 is a diagram illustrating a method of mapping data symbols for transmitting a downlink signal according to a fifth embodiment of the present invention.

In FIGS. 17(a) to 17(c), the data symbols are mapped in the direction in which the symbol index is increased. In particular, in FIG. 17(a), the data symbols are mapped to the segment band starting from the first OFDM symbol in the direction in which the symbol index is increased, but are not mapped to the control region. Then, the data symbols are mapped to the data region of the legacy band in the direction in which the symbol index is increased.

In FIG. 17(b), the data symbols are preferentially mapped to the segment band starting from the first OFDM symbol and are then mapped to the legacy band. At this time, the data symbols are also mapped to the OFDM symbols including the control region. The data symbols mapped to the actual control region are punctured and are not transmitted.

In FIG. 17(c), the data symbols are preferentially mapped to the segment band starting from the first OFDM symbol and are then mapped to the legacy band. At this time, the data symbols are mapped to the OFDM symbols including the control region excluding the minimum control region for preventing PCFICH errors in the first OFDM symbol. Finally, the data symbols mapped to the actual control region are punctured and are not transmitted.

In FIGS. 17(d) and 17(e), the data symbols are mapped in the direction in which the symbol index is decreased. In particular, in FIG. 17(d), the data symbols are also mapped to the OFDM symbols including the control region similarly to FIG. 17(b). The data symbols mapped to the actual control region are punctured and are not transmitted.

In FIG. 17(e), similarly to FIG. 17(c), the data symbols are mapped to the OFDM symbols including the control region excluding the minimum control region of the first OFDM symbol and the data symbols mapped to the actual control region are punctured and are not transmitted.

If the legacy band experiences a superior radio environment as compared to the segment band, the data symbols are preferably mapped to the legacy band in order to map systematic bits of the coded code block to the existing frequency band. In a sixth embodiment, a method of preferentially mapping the data symbols to the legacy band and then mapping the data symbols to the segment band will be described.

Figure 18:
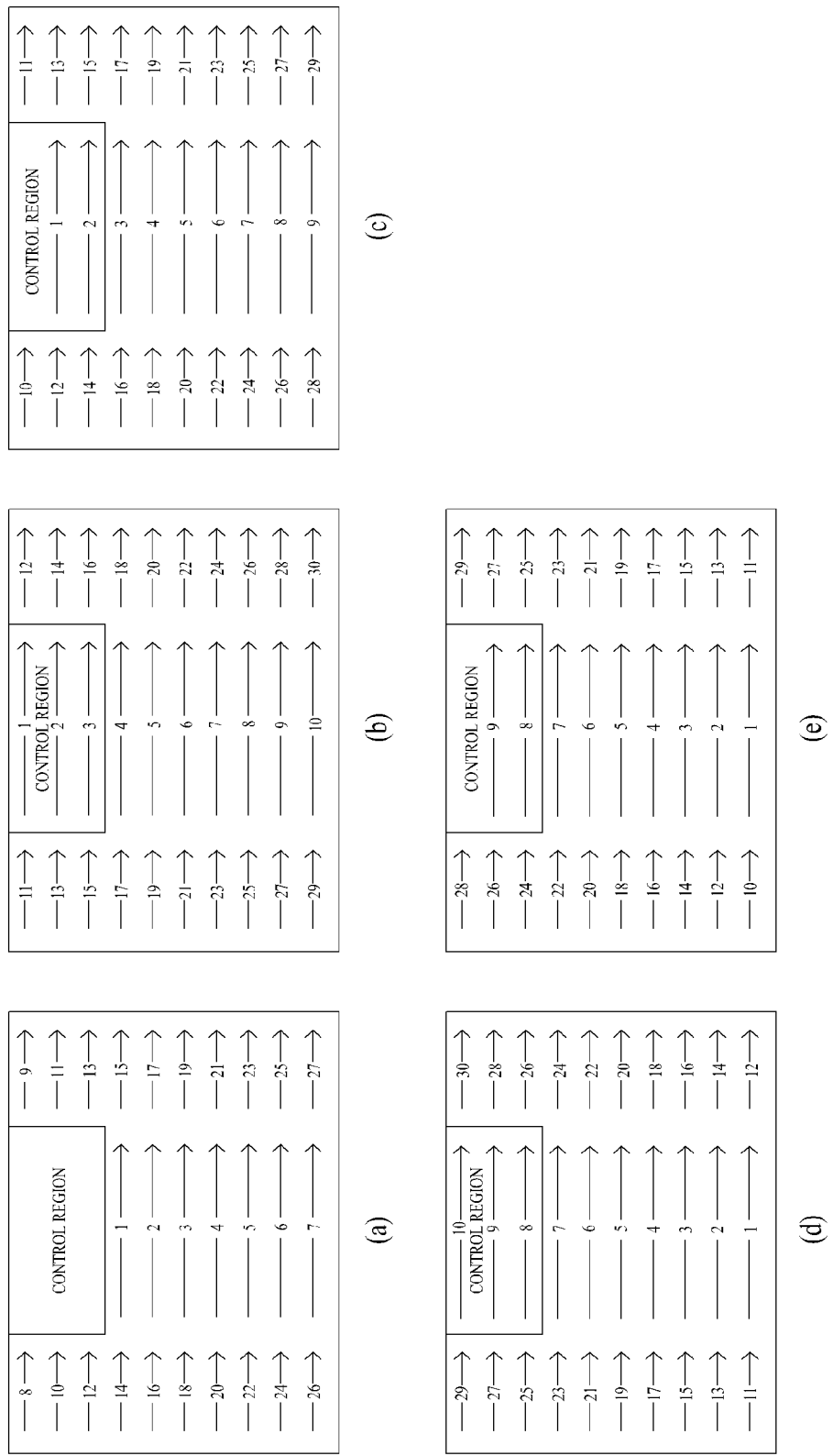
FIG. 18 is a diagram illustrating a method of mapping data symbols for transmitting a downlink signal according to a sixth embodiment of the present invention.

FIG. 18 is a diagram illustrating a method of mapping data symbols for transmitting a downlink signal according to a sixth embodiment of the present invention.

In FIGS. 18(a) to 18(c), the data symbols are mapped in the direction in which the symbol index is increased. In particular, in FIG. 18(a), the data symbols are preferentially mapped to the data region of the legacy band in the direction in which the symbol index is increased and the data symbols are then mapped to the segment band in the direction in which the symbol index is increased.

In FIG. 18(b), the data symbols are preferentially mapped to the OFDM symbols including the control region of the legacy band and the data symbols are then mapped to the segment band. The data symbols mapped to the actual control region are punctured and are not transmitted.

In FIG. 18(c), the data symbols are preferentially mapped to the OFDM symbols including the control region of the legacy band excluding the minimum control region for preventing PCFICH errors of the first OFDM symbol. Then, the data symbols are mapped to the segment band. The data symbols mapped to the actual control region are punctured and are not transmitted.

In FIGS. 18(d) and 18(e), the data symbols are preferentially mapped to the last OFDM symbol in the direction in which the symbol index is decreased. In particular, in FIG. 18(d), the data symbols are also mapped to the OFDM symbols including the control region similarly to FIG. 18(d). The data symbols mapped to the actual control region are punctured and are not transmitted.

In FIG. 18(e), the data symbols are mapped to the OFDM symbols including the control region excluding the minimum control region of the first OFDM symbol similarly to FIG. 18(c). The data symbols mapped to the actual control region are punctured and are not transmitted.

Figure 19:
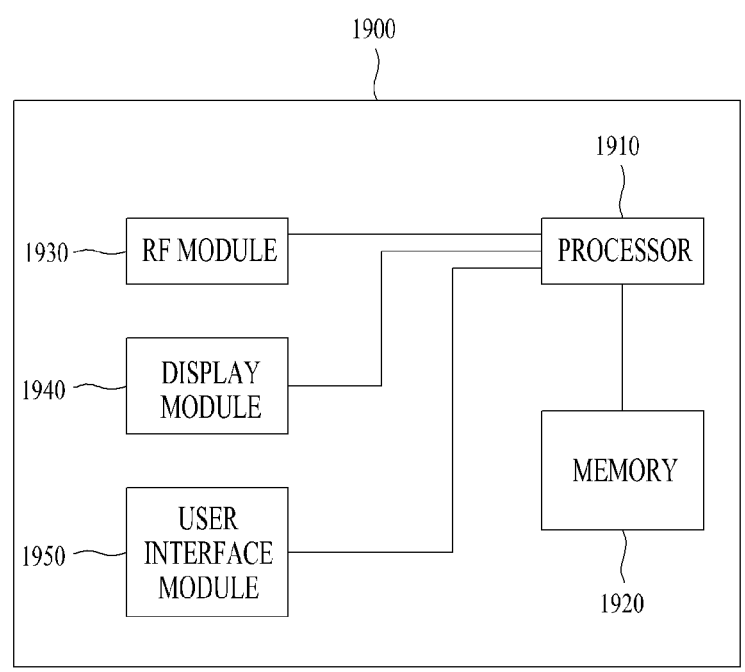
FIG. 19 is a block diagram showing a transmitter and receiver according to an embodiment of the present invention.

FIG. 19 is a block diagram showing a transmitter and receiver according to an embodiment of the present invention.

Referring to FIG. 19, a transmitter/receiver 1900 includes a processor 1910, a memory 1920, a Radio Frequency (RF) module 1930, a display module 1940 and a user interface module 1950.

The transmitter/receiver 1900 is shown for convenience of description and some modules thereof may be omitted. In addition, the transmitter/receiver 1900 may further include necessary modules. In addition, some modules of the transmitter/receiver 1900 may be subdivided. The processor 1910 is configured to perform an operation of the embodiment of the present invention described with respect to the drawings.

More specifically, if the transmitter/receiver 1900 is a portion of an eNB, the processor 1910 may perform a function for generating a control signal and mapping the control signal to a control channel set within a plurality of frequency blocks. If the transmitter/receiver 1900 is a portion of a UE, the processor 1910 may confirm a control channel indicated thereto from a signal received through a plurality of frequency blocks and extract a control signal.

Thereafter, the processor 1910 may perform a necessary operation based on the control signal. For a detailed description of the operation of the processor 1910, reference may be made to the description associated with FIGS. 1 to 18.

The memory 1920 is connected to the processor 1910 so as to store an operating system, an application, program code, data and the like. The RF module 1930 is connected to the processor 1910 so as to perform a function for converting a baseband signal into a radio signal or converting a radio signal into a baseband signal. The RF module 1930 performs analog conversion, amplification, filtering and frequency up-conversion or inverse processes thereof. The display module 1940 is connected to the processor 1910 so as to display a variety of information. As the display module 1940, although not limited thereto, a known device such as a Liquid Crystal Display (LCD), a Light Emitting Diode (LED), or an Organic Light Emitting Diode (OLED) may be used. The user interface module 1950 is connected to the processor 1910 and may be configured by a combination of known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary. Moreover, it will be apparent that some claims referring to specific claims may be combined with another claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with the terms fixed station, Node-B, eNode-B (eNB), or access point as necessary. The term "User Equipment (UE)" may also be replaced with the term subscriber station (SS) or mobile subscriber station (MSS) as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a radio communication system and, more particularly, to a method and apparatus for transmitting an aperiodic sounding reference signal in a radio communication system to which carrier aggregation is applied.

The invention claimed is:

1. A method for transmitting by a base station a data channel comprising at least one data symbol on a downlink component carrier having a specific bandwidth in a radio communication system, wherein the downlink component carrier comprises a system band in a middle of the specific bandwidth and a segment band on either side of the specific bandwidth in a frequency domain, and wherein the downlink component carrier comprises a control region comprising at least one Orthogonal Frequency Division Multiplexing (OFDM) symbol used for transmitting at least one control channel within the system band in a subframe, the method comprising:

allocating the at least one data symbol to at least one transmission resource within the specific bandwidth in an increasing direction of a frequency index; and transmitting the data channel to a user equipment using the at least one transmission resource, wherein the at least one data symbol is allocated to the system band and the segment band, and the at least one data symbol allocated to the control region is punctured by the at least one control channel.

2. The method according to claim 1, wherein the allocating of the at least one data symbol includes allocating the at least one data symbol to the at least one transmission resource in an increasing direction of an OFDM symbol index.

3. The method according to claim 1, wherein the at least one data symbol is not allocated to the control region in a first OFDM symbol of the at least one OFDM symbol.

4. The method according to claim 1, wherein the at least one data symbol is not allocated to the control region in the at least one OFDM symbol.

5. The method according to claim 1, wherein the at least one data symbol is not allocated to the segment band if the radio communication system is a Long Term Evolution (LTE) system.

6. A base station for transmitting a data channel comprising at least one data symbol on a downlink component carrier having a specific bandwidth in a radio communication system, wherein the downlink component carrier comprises a system band in a middle of the specific bandwidth and a segment band on either side of the specific bandwidth in a frequency domain, and wherein the downlink component carrier comprises a control region comprising at least one Orthogonal Frequency Division Multiplexing (OFDM) symbol used for transmitting at least one control channel within the system band in a subframe, the base station comprising:

a processor configured to allocate the at least one data symbol to at least one transmission resource within the specific bandwidth in an increasing direction of a frequency index; and a transmission module configured to transmit the data channel to a user equipment using the at least one transmission resource, wherein the at least one data symbol is allocated to the system band and the segment band, and the at least one data symbol allocated to the control region is punctured by the at least one control channel.

7. The base station according to claim 6, wherein the processor is further configured to allocate the at least one data symbol to the at least one transmission resource in an increasing direction of an OFDM symbol index.

8. The base station according to claim 6, wherein the at least one data symbol is not allocated to the control region in a first OFDM symbol of the at least one OFDM symbol.

9. The base station according to claim 6, wherein the at least one data symbol is not allocated to the control region in the at least one OFDM symbol.

10. The base station according to claim 6, wherein the at least one data symbol is not allocated to the segment band if the radio communication system is a Long Term Evolution (LTE) system.

* * * * *